United States Patent Office 2,793,234
Patented May 21, 1957

2,793,234

SULFOXIDES AND SULFONES OF 1,2-DICHLORO-ETHYLENE DERIVATIVES

Jean Metivier, Arpajon, France, assignor to Societe des Usines Chimiques Rhone-Poulenc, Paris, France, a body corporate of France No Drawing. Application March 11, 1955,
Serial No. 493,809

Claims priority, application Great Britain March 30, 1954

5 Claims. (Cl. 260—607)

This invention is for improvements in or relating to ethylene derivatives and compositions containing the same and its object is to provide new ethylene derivatives of considerable industrial interest and more particularly useful as fungicides.

The compounds of this invention conform to the formula:

$$Ar\text{—}C_nH_{2n}\text{—}X\text{—}CCl\text{=}CHCl$$

wherein Ar represents a radical selected from the group consisting of phenyl and phenyl having at least one substituent selected from the group consisting of halogen, lower alkyl of at most three carbon atoms, and methoxy; $n$ is selected from the group consisting of zero and one; and X is a divalent sulfur-containing radical selected from the group consisting of SO and $SO_2$.

These products may be obtained by oxidation of the corresponding sulphides, that is to say, of compounds conforming to the foregoing formula but in which the group X is replaced by a sulphur atom. As oxidising agents there can be used substances known to be capable of oxidising a sulphide into a sulphoxide or a sulphone and more particularly peroxides (including hydrogen peroxide), per salts (such as alkaline permanganates) and the per-acids.

The reaction is preferably carried out in an organic solvent medium, for example, in acetic acid or in acetone. When it is desired to obtain the sulphoxide, the theoretical quantity or a slight excess of oxidising agent is employed, preferably at room temperature (20–25° C.), at which temperature formation of sulphoxide takes place readily; under these conditions oxidation to the corresponding sulphone is very slow. Where the corresponding sulphone is required, it is advantageous to employ an excess of oxidising agent. It is possible to operate at room temperature, but the reaction is fairly slow; it is in consequence preferable to employ a reaction temperature of about 50–60° C., at which temperature the reaction is more rapid. The sulphones can also be prepared by oxidation of the corresponding sulphoxides. In this case again, it is possible to operate at room temperature but the reaction is more rapid and more complete at about 50–60° C.

The products of the invention have proved to be remarkable fungicides and have application, therefore, in agriculture. Of outstanding importance for the stated purpose are those compounds of the foregoing general formula in which X represents the group —$SO_2$—, Ar represents 4-chlorophenyl, 4-methylphenyl, or 4-methoxyphenyl and $n=0$ i. e. $C_nH_{2n}$ represents a single bond, namely the compounds: 1:2-dichloro-1-(4′-chlorophenylsulphonyl)-ethylene, 1:2-dichloro-1-(4′-methylphenylsulphonyl)-ethylene, and 1:2-dichloro-1-(4′-methoxyphenylsulphonyl)-ethylene.

The products may be used in various forms according to the specific purposes, but in general they are employed in association with an inert diluent to produce such compositions as powders, sprays, aerosols, emulsions or solutions in organic or aqueous-organic media. In the case of aqueous emulsions it is perferred to add a wetting, dispersing or emulsifying agent of the ionic or nonionic type, especially the latter which are not affected by electrolytes. The emulsion type of formulation is preferably made up as a self-emulsifying concentrate containing the active substance dissolved in the dispersing agent or in a solvent compatible with that dispersing agent, the composition being made ready for use by the simple addition of water. The new compounds may also be employed in admixture with synergistic products. Fungicidal compositions containing the compounds of the invention in association with an inert diluent are within the scope of the present invention.

The following examples show how the invention can be carried into practice.

*Example I*

To a solution of 19.2 g. of 1:2-dichloro-1-phenylthio-ethylene (B. P.$_{22}$=1456–150° C., prepared in accordance with N. V. Cusa and H. McCombie, J. C. S. 1937, 769) in 60.5 cc. of acetic acid, is gradually added a solution prepared from 20.8 cc. of acetic acid, 9.3 cc. of hydrogen peroxide (125 volumes) and 0.9 cc. of sulphuric acid ($d$=1.83). The temperature is allowed spontaneously to rise to about 35° C., at which the mixture is then held. The mixture is then left overnight.

The reaction mixture is poured into 300 cc. of water. An oil separates, which is decanted, taken up in ether and washed with a solution of sodium bicarbonate. The ethereal solution is dried over sodium sulphate and concentrated under reduced pressure. An oil having little colouring remains, analysis of which shows that it is 1:2-dichloro-1-phenylsulphinyl-ethylene.

*Example II*

To a solution of 20.5 g. of 1:2-dichloro-1-phenylthio-ethylene (J. C. S. 1937, 769) in 40 cc. of acetic acid is gradually added, while the temperature is maintained at about 10° C., a solution prepared from 24 cc. of hydrogen peroxide (125 volumes), 60 cc. of acetic acid, and 2 cc. of sulphuric acid ($d$=1.83). The homogeneous mixture is kept in ice-water for one night and then at the temperature of the laboratory for three days. The crystalline precipitate which has formed is filtered, washed with water and recrystallised from ethyl alcohol. 1:2-dichloro-1-phenylsulphonyl-ethylene is thus obtained, which melts at 70° C. (Kofler). A further quantity of product can be obtained by precipitating the acetic acid mother liquors by means of water.

*Example III*

To a solution of 24 g. of 1:2-dichloro-1-(4′-chlorophenylthio)-ethylene (B. P.$_{0.7}$=104°–107° C., prepared by analogy with N. V. Cusa and H. McCombie, J. C. S. 1937, 769) in 65 cc. of acetic acid is added in one lot, while the temperature is maintained at about 10° C., a solution prepared from 10 cc. of hydrogen peroxide (125 volumes), 22.5 cc. of acetic acid and 1 cc. of sulphuric acid ($d$=1.83). After brisk stirring for some time, the mixture becomes homogeneous. The temperature is allowed to rise spontaneously to about 35° C., whereafter it is alowed to stand for one night. The reaction mixture is then poured into 350 cc. of water, and an oil precipitates and soon crystallises. The product is filtered, washed with water and recrystallised from alcohol. 1:2-dichloro-1-(4′-chlorophenylsulphinyl)-ethylene is thus obtained, which melts at about 76° C. (Kofler).

*Example IV*

To a solution of 24 g. of 1:2-dichloro-1-(4′-chlorophenylthio)-ethylene in 40 cc. of acetic acid is added dropwise in 20 minutes, while the temperature is maintained at about 8°–10° C., a solution prepared from 60 cc. of acetic acid, 24 cc. of hydrogen peroxide (130 volumes) and 2 cc. of sulphuric acid ($d=1.83$). After the addition, the mixture is cooled in ice-water while being rapidly stirred. At the end of half an hour, the mixture becomes homogeneous. It is kept in ice-water for 6 hours and then allowed to stand at the ambient temperature (20°–27° C.) for four days. A crystalline deposit forms, which is filtered and crushed in a mortar with 50 cc. of water, filtered, dried and recrystallised from ethyl alcohol. 1:2 - dichloro - 1 - (4' - chlorophenylsulphonyl) - ethylene is thus obtained which melts at 101°–102° C. (Kofler).

*Example V*

To a solution of 60 g. of 1:2-dichloro-1-(4'-chlorophenylsulphinyl)-ethylene in 125 cc. of acetic acid is added a solution prepared from 29 cc. of hydrogen peroxide (128 volumes), 75 cc. of acetic acid and 1.5 cc. of sulphuric acid ($d=1.83$). The homogeneous solution obtained is heated at 55° C. for 24 hours and then cooled to 5° C. The precipitate obtained is filtered off and after crystallisation from alcohol, 47 g. of 1:2-dichloro-1-(4'-chlorophenylsulphonyl)-ethylene, which melts at 102° C. (Kofler), are obtained.

*Example VI*

To a solution cooled to 10° C. of 196.5 g. of 1:2-dichloro - 1 - (4' - chlorophenylthio) - ethylene in 320 cc. of acetic acid is gradually added a solution prepared from 200 cc. of hydrogen peroxide (125 volumes), 480 cc. of acetic acid and 17 cc. of sulphuric acid ($d=1.83$). During the addition, the temperature of the mixture is maintained at about 10° C. by cooling it from time to time by immersion in iced water. When the addition is complete, the temperature of the mixture is allowed to rise spontaneously to 35° C. and, on completion of the exothermic reaction, the mixture is heated at 50° C. for 24 hours.

The mixture is then cooled to 5° C. and the white precipitate obtained (240 g. moist) is filtered off and recrystallised from 200 cc. of boiling ethyl alcohol. The alcohol solution is cooled and the crystals formed are filtered off and dried in vacuo in an oven the temperature of which is adjusted to 40° C. 177 g. of 1:2-dichloro-1-(4'-chlorophenylsulphonyl)-ethylene, which melts at 102° C., are obtained.

*Example VII*

To a solution of 42.6 g. of 1:2-dichloro-1-(4'-bromophenylthio)-ethylene in 97.5 cc. of acetic acid is gradually added a solution prepared from 15 cc. of hydrogen peroxide (125 volumes), 34 cc. of acetic acid and 1.5 cc. of sulphuric acid ($d=1.83$). The addition is so regulated as to maintain the temperature at about 10° C. if necessary by cooling with iced water. When the addition is complete, the temperature is allowed to rise spontaneously to 32° C., whereafter the mixture is cooled with iced water and left overnight. The reaction mixture is poured into 600 cc. of distilled water and crystallisation of the product immediately takes place. The precipitate obtained (48 g.) is filtered off and crystallised from ethyl alcohol. 1:2 - dichloro - 1 - (4' - bromophenylsulphinyl)-ethylene, which melts at 68–70° C. (Kofler) is thus obtained.

*Example VIII*

To a solution of 56.8 g. of 1:2-dichloro-1-(4'-bromophenylthio)-ethylene in 80 cc. of acetic acid is gradually added a solution prepared from 50 cc. of hydrogen peroxide (125 volumes), 120 cc. of acetic acid and 2 cc. of sulphuric acid ($d=1.83$), the temperature being maintained below 10° C. When the addition is complete and the exothermic reaction is ended, the mixture is allowed to stand for 4 days at room temperature. The white precipitate formed (23 g.) is filtered off and crystallised from ethyl alcohol. 1:2-dichloro-1-(4'-bromophenylsulphony)-ethylene, which melts at 80° C., is thus obtained.

1:2 - dichloro - 1 - (4' - bromophenylthio) - ethylene which is employed as starting material in Examples VII and VIII is obtained by reacting trichloroethylene with p-bromothiophenol (Backer and Kramer, Rec. trav. chim. 53, 1102 (1934)). Thus, to 303 g. of trichloroethylene heated to 70° C. is added a solution prepared from 109 g. of p-bromothiophenol and 280 cc. of a solution of potassium ethoxide in alcohol (190 g. per litre). At the end of the addition, the mixture is heated at 60–65° C. for 5 hours in an atmosphere of nitrogen. The reaction mixture is taken up in water and the organic layer is separated. The fraction boiling at 133–134° C. under a pressure of 0.9 mm. Hg is collected by distillation and is shown by analysis to be 1:2-dichloro-1-(4'-bromophenylthio)-ethylene.

*Example IX*

To a solution of 32.85 g. of 1:2-dichloro-1-(4'-methylphenylthio)-ethylene in 97.5 cc. of acetic acid is gradually added, while the temperature is maintained at about 10° C., a solution prepared from 15 cc. of hydrogen peroxide (125 volumes), 34 cc. of acetic acid and 1.5 cc. of sulphuric acid ($d=1.83$). When the addition is completed, the temperature of the mixture is allowed to rise to 35° C. and it is then cooled in water to room temperature. The mixture is left overnight and treated as described in Example VII. On crystallisation from alcohol, 30.7 g. of 1:2 - dichloro - 1 - (4' - methylphenylsulphinyl) - ethylene, which melts at 62° C. (Kofler), are obtained.

*Example X*

The procedure described in Example VIII, is followed but the 56.8 g. of 1:2 - dichloro - 1 - (4' - bromophenylthio) - ethylene are replaced by 43.8 g. of 1:2 - dichloro-1-(4'-methylphenylthio)-ethylene. On crystallisation from ethyl alcohol, 32 g. of 1:2 - dichloro - 1 - (4' - methylphenylsulphonyl)-ethylene, which melts at 76° C. (Kofler), are obtained.

1:2 - dichloro - 1 - (4' - methylphenylthio) - ethylene, a liquid boiling at 120–121° C. under 1 mm. of mercury, is prepared in the same way as 1:2 - dichloro - 1 - (4'-bromophenylthio) - ethylene (see Example VIII), the p-bromothiophenol being replaced by p-thiocresol (Miescher and Billeter, Helv. Chem. Acta 22, 609, 610 (1939)).

*Example XI*

The procedure described in Example IX is followed but the 32.85 g. of 1:2 - dichloro - 1 - (4' - methylphenylthio) - ethylene are replaced by 37.05 g. of 1:2 - dichloro-1-(4'-isopropylphenylthio)-ethylene. On crystallisation from alcohol, 25.5 g. of 1:2-dichloro-1-(4'-isopropylphenylsulphinyl)-ethylene, which melts at 56° C. (Kofler), are obtained.

*Example XII*

The procedure of Example X is followed but the 43.8 g. of 1:2-dichloro-1-(4'-methylphenylthio)-ethylene are replaced by 49.4 g. of 1:2-dichloro-1-(4'-isopropylphenylthio)-ethylene. After standing for 4 days at room temperature, the reaction mixture is poured into 1100 cc. of water and the oil which is formed is extracted with 200 cc. and then 100 cc. of ether. The ethereal layer is washed with a 10% sodium bicarbonate solution to remove acetic acid and then with 100 cc. of water and dried over potassium carbonate. The ether is driven off and the residual oil (44 g.) partially crystallises slowly. The crystals formed are filtered off and recrystallised from petroleum ether. 1:2-dichloro-1-(4'-isopropylphenylsulphenyl)-ethylene, which melts at 33–34° C. (cap.), is thus obtained.

*Example XIII*

To a solution of 49.4 g. of 1:2-dichloro-1-(4'-isopropylphenylthio)-ethylene in 115 cc. of acetic acid is gradually added, while the temperature is maintained below 10° C., a solution prepared from 50 cc. of hydrogen peroxide (125 volumes), 60 cc. of acetic acid and 1 cc. of sulphuric acid ($d=1.83$). When the addition is completed, the temperature is allowed to rise spontaneously until the end of the exothermic reaction. The reaction mixture is then heated at 60° C. for 24 hours, whereafter it is cooled to about 5° C. An oily layer, which crystallises readily, is formed; the crystals formed are filtered off and dried (44 g.). On recrystallisation from petroleum ether, 1:2-dichloro-1-(4'-isopropylphenylsulphonyl)-ethylene, melting at 34° C. (cap.) and identical to the sample prepared in Example XII, is obtained.

1:2-dichloro-1-(4'-isopropylphenylthio)-ethylene, a substantially colourless liquid boiling at 124–126° C. under 0.8 mm. of mercury, is prepared in the same way as 1:2-dichloro-1-(4'-bromophenylthio)-ethylene, the p-bromothiophenol being replaced by p-isopropylthiophenol (Gilman and Broadbent: J. A. C. S. 69, 2054 (1947)).

*Example XIV*

To a solution of 23.5 g. of 1:2-dichloro-1-(4'-methoxyphenylthio)-ethylene in 65 cc. of acetic acid is added a solution prepared from 10 cc. of hydrogen peroxide (125 volumes), 23 cc. of acetic acid and 1 cc. of sulphuric acid ($d=1.83$). The mixture is treated as in Example XII and 1:2-dichloro-1-(4'-methoxyphenylsulphinyl)-ethylene, which melts at 35–36° C. (cap.), is finally obtained.

*Example XV*

To a solution of 23.5 g. of 1:2-dichloro-1-(4'-methoxyphenylthio)-ethylene in 40 cc. of acetic acid is added a solution prepared from 25 cc. of hydrogen peroxide (125 volumes), 60 cc. of acetic acid and 1 cc. of sulphuric acid ($d=1.83$). When the addition is completed, the temperature of the mixture is allowed to rise to 35° C., and, on completion of the exothermic reaction, the mixture is heated at 60° C. for 48 hours. The reaction mixture is then poured into 400 cc. of water, and the solid which separates is filtered off and recrystallised from ethyl alcohol. The 1:2-dichloro-1-(4'-methoxyphenylsulphonyl)-ethylene, which melts at 62° C. (Kofler), is thus obtained.

1:2-dichloro-1-(4'-methoxyphenylthio)-ethylene is prepared by heating for 3 hours at 65–68° C. in an atmosphere of nitrogen a mixture of 168.8 g. of trichloroethylene, 160 cc. of a solution of potassium ethoxide in ethyl alcohol (190 g. per litre) and 45 g. of p-methoxythiophenol (Suter and Hansent, J. A. C. S. 54, 4102 (1932)). After cooling, the cold mixture is taken up in 450 cc. of water and the organic layer which separates is removed, dried and concentrated under reduced pressure. The residue obtained (71 g.) is distilled under reduced pressure and the fraction boiling at 132–133° C. under 1 mm. of mercury, which is 1:2-dichloro-1-(4'-methoxyphenylthio)-ethylene, is collected.

*Example XVI*

To a solution of 37.35 g. of 1:2-dichloro-1-(4'-ethoxyphenylthio)-ethylene in 97.5 cc. of acetic acid is added, while the temperature is maintained at about 10° C., a solution prepared from 15 cc. of hydrogen peroxide (125 volumes), 34 cc. of acetic acid and 1.5 cc. of sulphuric acid ($d=1.83$). The procedure described in Example IX is then followed. After crystallisation of the product from a mixture of ether and petroleum ether, 1:2-dichloro-1-(4'-ethoxyphenylsulphinyl)-ethylene, which melts at 58° C. (Kofler), is obtained.

*Example XVII*

The procedure of Example X is followed but the 43.8 g. of 1:2-dichloro-1-(4'-methylphenylthio)-ethylene are replaced by 49.8 g. of 1:2-dichloro-1-(4'-ethoxyphenylthio)-ethylene. After standing for 4 days at room temperature, the reaction mixture is cooled to 3° C. and the precipitate formed is filtered off. On crystallisation of the precipitate from ethyl alcohol 1:2-dichloro-1-(4'-ethoxyphenylsulphonyl)-ethylene, which melts at 78° C. (Kofler), is obtained.

1:2-dichloro-1-(4'-ethoxyphenylthio)-ethylene is a colourless liquid boiling at 135–137° C. under a pressure of 1 mm. of mercury. It is prepared in the same manner as 1:2-dichloro-1-(4'-methoxyphenylthio)-ethylene, the p-methoxythiophenol being replaced by p-ethoxythiophenol (prepared in the same way as p-methoxythiophenol).

*Example XVIII*

The procedure of Example XIV is followed but the 23.5 g. of 1:2-dichloro-1-(4'-methoxyphenylthio)-ethylene are replaced by 27.4 g. of 1:2-dichloro-1-(2':5'-dichlorophenylthio)-ethylene. On crystallisation of the product from alcohol, 1:2-dichloro-1-(2':5'-dichlorophenylsulphinyl)-ethylene, which melts at 116–118° C. (Kofler), is obtained.

1:2-dichloro-1-(2':5'-dichlorophenylthio)-ethylene, a liquid boiling at 134–136° C. under 1.5 mm. of mercury, is prepared by reacting 2:5-dichlorothiophenol (obtained from 2:5-dichlorobenzene sulphochloride by reduction with tin, Stewart, J. C. S. 1922, 2555) with trichloroethylene in the presence of potassium ethoxide by analogy with the preparation of 1:2-dichloro-1-(4'-methoxyphenylthio)-ethylene.

*Example XIX*

The procedure of Example XVIII is followed but the 27.4 g. of 1:2-dichloro-1-(2':5'-dichlorophenylthio)-ethylene are replaced by 25.3 g. of 1:2-dichloro-1-(2'-methyl-5'-chlorophenylthio)-ethylene. The mixture crystallises after standing for a night. The solid is filtered off and recrystallised from ethyl alcohol. 1:2-dichloro-1-(2'-methyl-5'-chlorophenylsulphinyl)-ethylene, which melts at 115° C. (Kofler), is thus obtained.

1:2-dichloro-1-(2'-methyl-5'-chlorophenylthio)-ethylene is prepared in the same way as 1:2-dichloro-1-(2':5'-dichlorophenylthio)-ethylene starting from 2-methyl-5-chlorobenzene sulphochloride (Huntress and Carten, J. A. C. S. 62, 513 (1940)).

*Example XX*

To a solution of 26 g. of 1:2-dichloro-1-(2'-carboxyphenylthio)-ethylene in 375 cc. of acetic acid at 35° C. is added a solution prepared from 10.4 cc. of hydrogen peroxide (125 volumes), 25 cc. acetic acid and 1 cc. of sulphuric acid ($d=1.83$), the temperature being maintained at 35° C. during the addition. The reaction mixture is left over night at room temperature and is then poured into 2 litres of water. The solid which separates is filtered off and after crystallisation from ethyl alcohol, 1:2-dichloro-1-(2'-carboxyphenylsulphinyl)-ethylene, which melts at 214° C. (Kofler), is obtained.

1:2-dichloro-1-(2'-carboxyphenylthio)-ethylene is prepared by reacting trichloroethylene with thiosalicylic acid (Org. Syn. Coll., vol. II. 580 (1946)), in the presence of potassium ethoxide. It is a solid which melts at 176° C. (Kofler) after crystallisation from benzene.

*Example XXI*

To a solution of 18 g. of 1:2-dichloro-1-(β-naphthylthio)-ethylene in 48 cc. of acetic acid is added a solution prepared from 7 cc. of hydrogen peroxide (125 volumes), 17 cc. of acetic acid and 0.7 cc. of sulphuric acid ($d=1.83$), the temperature being maintained at about 12° C. during the addition. When the addition is completed the temperature of the mixture is allowed to rise spontaneously to 35° C. The mixture is then cooled to 20° C. and left over night at room temperature. Thereafter it is poured into 800 cc. of water and the solid which separates (22 g.) is filtered off. On crystallisation of the solid from ethyl alcohol, 1:2-dichloro-1-

(β-naphthylsulphinyl)-ethylene, which melts at 101–102° C. (Kofler), is obtained.

1:2 - dichloro - 1 - (β - naphthylthio) - ethylene is a liquid boiling at 164–167° C. under a pressure of 0.7 mm. of mercury. It is prepared by reacting β-thionaphthol (Zincke and Eismayer, Ber. 51, 755 (1918)) with trichloroethylene in the presence of potassium ethoxide by analogy with the reaction between p-methoxythiophenol and trichloroethylene (see Example XV).

*Example XXII*

To 131.5 g. of cold trichloroethylene (+2° C.) there is added a solution prepared from 100 cc. of ethyl alcohol, 5.75 g. of sodium and 31 g. of benzyl mercaptan. The reaction mixture is cooled externally by iced-water and the rate of addition of the benzyl mercaptan solution is so adjusted that the temperature of the mixture does not exceed +7° C. When the addition is complete, the reaction mixture is left and the temperature is allowed slowly to return to room temperature (20° C.). The mixture is then gradually heated to 75° C. and is maintained at that temperature for 1½ hours. After cooling, the mixture is poured into 350 cc. of water, the organic layer is separated, washed twice with 250 cc. of water, dried over potassium carbonate and concentrated by heating at 60–70° C. under a pressure of 20–30 mm. of mercury. The residue obtained is distilled under reduced pressure and that fraction distilling at 100–105° C. under 1.5 to 2mm. pressure is recovered. There is thus obtained 21.4 g. of 1:2-dichloro-1-benzylthio-ethylene.

To a stirred solution of 21.9 g. of 1:2-dichloro-1-benzylthio-ethylene in 40 cc. of acetic acid there is added a mixture of 25 cc. of hydrogen peroxide (125 vols.), 60 cc. of acetic acid and 2 cc. of sulphuric acid ($d=1.83$). During the addition the mixture is cooled externally and the temperature is not allowed to exceed 10° C. When the addition is complete, the reaction mixture is stirred on an iced-water bath for two hours and then left for three days at room temperature.

The solution obtained is poured into 250 cc. of distilled water and the oil which separates is caused to crystallise by scraping the interior of the vessel. The product obtained is filtered off, washed with 250 cc. of water and dried in vacuo over sulphuric acid.

There is thus obtained 20 g. of 1:2-dichloro-1-benzylsulphonyl-ethylene which, on recrystallisation from an ethyl alcohol/petroleum ether mixture, melts at 58–60° C.

*Example XXXIII*

To a solution of 32.8 g. of 1:2-dichloro-1-benzylthio-ethylene in 97.5 cc. of acetic acid, there is added a mixture of 34 cc. of acetic acid, 15 cc. of hydrogen peroxide (125 vols.) and 1.5 cc. of sulphuric acid ($d=1.83$). During the addition, the mixture is cooled externally and the temperature is not allowed to exceed 12° C. When the addition is complete, the temperature of the reaction mixture is raised to 35° C., after which the mixture is cooled on an iced-water bath and then left to stand overnight at room temperature.

The reaction mixture is poured into 600 cc. of distilled water and extracted with 200 cc. and then 100 cc. of ether. The combined ethereal extracts are washed twice with 200 cc. of a saturated solution of sodium bicarbonate, twice with 200 cc. of distilled water and then dried over potassium carbonate. The solution is filtered and the ether is distilled off under reduced pressure. The oily residue triturated with 100 cc. of petroleum ether crystallises.

After drying in vacuo there is obtained 22.5 g. of 1:2-dichloro-1-benzylsulphinyl-ethylene which melts at 48–49° C. (capillary tube).

*Example XXIV*

To a solution of 25.4 g. of 1:2-dichloro-1-(4'-chlorobenzylthio)-ethylene in 87.6 cc. of acetic acid is added a solution prepared from 22.6 cc. of acetic acid, 10 cc. of hydrogen peroxide (125 volumes) and 1 cc. of sulphuric acid ($d=1.83$), the temperature being maintained at about 10° C. When the addition is complete, the temperature of the mixture is allowed to rise spontaneously to 35° C. whereafter the mixture is cooled to 20° C. and maintained at that temperature overnight.

The reaction mixture is poured into 800 cc. of water and the solid which is precipitated is filtered off. On recrystallisation from ethyl alcohol there is obtained 23.5 g. of 1:2-dichloro-1-(4'-chlorobenzylsulphinyl)-ethylene which melts at 80° C. (Kofler).

1:2-dichloro-1-(4'-chlorobenzylthio)-ethylene, which is employed as starting material, is prepared in the same way as 1:2-dichloro-1-(4'-bromophenylthio)-ethylene (see Example VIII, the p-bromothiophenol being replaced by p-chlorobenzyl mercaptan (Lewis and Archer, J. A. C. S. 73, 2109 (1951)). It is a slightly coloured liquid boiling at 120–121° C. under a pressure of 0.6 mm. of mercury.

*Example XXV*

To a solution of 10 g. of 1:2-dichloro-1-(4'-chlorobenzylsulphinyl)-ethylene in 40 cc. of acetic acid there is added a solution prepared from 4 cc. of hydrogen peroxide (125 volumes) and 0.4 cc. of sulphuric acid ($d=1.83$) and the mixture is heated in an oven at 60° C. for 40 hours. On cooling the mixture in ice-water there is obtained a copious precipitate (7 g.). On crystallisation of the precipitate from ethyl alcohol there is obtained 1:2-dichloro - 1-(4'-chlorobenzylsulphonyl) - ethylene, which melts at 85–86° C. (Kofler).

A further quantity of the product may be obtained by diluting the acetic acid mother liquors with water.

I claim:

1. A member of the class consisting of ethylene derivatives of the formula:

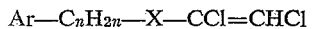
$$Ar-C_nH_{2n}-X-CCl=CHCl$$

wherein Ar represents a radical selected from the group consisting of phenyl and phenyl having at least one substituent selected from the group consisting of halogen, lower alkyl of most three carbon atoms, and methoxy; $n$ is selected from the group consisting of zero and one; and X is a divalent sulfur-containing radical selected from the group consisting of SO and SO₂.

2. An ethylene derivative of the formula:

$$Ar-X-CCl=CHCl$$

wherein Ar represents a radical selected from the group consisting of phenyl and phenyl having at least one substituent selected from the group consisting of halogen, lower alkyl of at most three carbon atoms, and methoxy; and X is a divalent sulfur-containing radical selected from the group consisting of SO and SO₂.

3. 1:2-dichloro-1-(4'-chlorophenylsulphonyl)-ethylene.

4. 1:2-dichloro-1-(4'-methylphenylsulphonyl) - ethylene.

5. 1:2-dichloro-1-(4'-methoxyphenylsulphonyl) - ethylene.

References Cited in the file of this patent

UNITED STATES PATENTS

| | | |
|---|---|---|
| 2,163,180 | Ufer | June 20, 1939 |
| 2,207,021 | Martin et al. | July 9, 1940 |
| 2,623,838 | Bender | Dec. 30, 1952 |

FOREIGN PATENTS

| | | |
|---|---|---|
| 210,644 | Germany | Oct. 27, 1907 |

OTHER REFERENCES

Cusa et al.: Journal of the Chemical Society, 1937, page 769.